(No Model.)
H. HACKNEY.
BELT TIGHTENER.
No. 488,197. Patented Dec. 20, 1892.
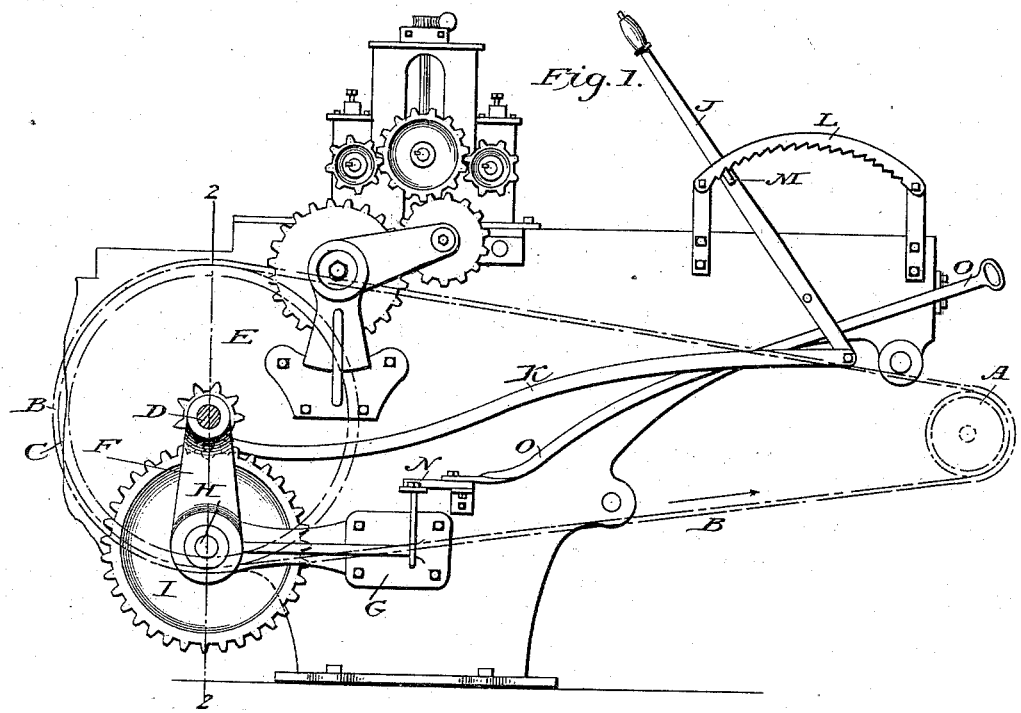
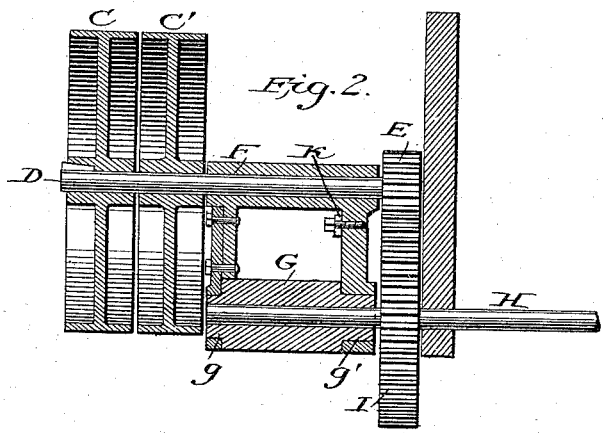
Witnesses.
V. Hugo.
O. R. Barnett.
Inventor.
Herbert Hackney
By Raymond & Veeder
Attys

UNITED STATES PATENT OFFICE.

HERBERT HACKNEY, OF SOUTH EVANSTON, ILLINOIS, ASSIGNOR TO THE BENJAMIN MACHINE COMPANY, OF ILLINOIS.

BELT-TIGHTENER.

SPECIFICATION forming part of Letters Patent No. 488,197, dated December 20, 1892.

Application filed January 6, 1892. Serial No. 417,239. (No model.)

*To all whom it may concern:*

Be it known that I, HERBERT HACKNEY, of South Evanston, county of Cook, State of Illinois, and a citizen of the United States, have invented certain new and useful Improvements in Belt-Tighteners, of which the following is a specification, reference being had to the accompanying drawings.

My device as herein shown is applied to the feed-works of a wood-working machine, that being the chief use I contemplate, but it is applicable to any situation in which a belt-tightener is desirable.

In wood-working machines it is especially desirable for many reasons to provide the adjustment of the tension of the feed-belt to suit the work. With the devices herein shown and described the tension of the feed-belt can be adjusted so as to be barely sufficient to feed the lumber under ordinary conditions so that if any accident which clogs the machine takes place the belt will cease to drive. The feed will cease instantly upon the slackening of the belt although the latter has been stopped by an accident, and cannot, by reason of its stoppage, be shifted to the loose pulley.

In the drawings: Figure 1 is a side view of a portion of the machine-frame showing enough of the feed-gearing to illustrate the application of my invention. Fig. 2 is a vertical cross-section on line 2, 2, of Fig. 1.

For the sake of clearness the feed-belt and the pulleys whereon it runs are indicated only in dotted outline in Fig. 1 so that the gearing and other devices behind the said pulleys are visible.

A is a pulley driven from any convenient part of the machine and connected by the belt B to the pulley C. The pulley C is mounted upon one end of a shaft D which carries at its other end a pinion E. A swinging-frame F supports said shaft D, the pivot upon which the frame swings consisting of a bracket G attached to the machine-frame and having journals $g$ $g'$ (*vide* Fig. 2) formed upon its outer end. Said bracket also supports a shaft H which is fitted in a bearing of the bracket G concentric with the journals $g$ $g'$. Upon the shaft H is a gear I meshing with the pinion E.

Pivoted to the machine-frame is a hand-lever J (Fig. 1) which is connected by a rod K to the swinging-frame F. The hand-lever J may be secured in any position by means of the notched quadrant L, a suitable dog, M, adapted to engage with said quadrant and operated in any convenient manner, being provided upon the lever J.

The shaft H is connected to the feed-works by any suitable gearing, the latter not being shown, as the present invention does not relate thereto except incidentally.

The operation of the device is as follows: The shifting of the hand-lever J will move the swinging-frame F so as to cause the pulley C to approach to or recede from the pulley A and, hence, loosen or tighten the belt as may be desired. The fact that the pivot of the swinging-frame and the shaft H are concentric maintains the shafts D and H in the same driving relation to each other however the swinging-frame and its pulleys may be shifted. It is obvious that it is not essential to have a gear-connection between the shafts D and H, but that any other equivalent connection may be adopted and, further, that it is not essential to the operation of the tightener that a tight and loose pulley C, C', be used, as shown in Fig. 2, as one single tight pulley may be used. The tightener herein described is however especially useful in connection with tight and loose pulleys by permitting the belt to be shifted on the tight and loose pulleys without disturbance of the adjustment of the tightener. The tightener also permits changes in the rates of feed by using various sized pulleys in place of pulley A without changing the length of the belt, a re-adjustment of the tightener being all that is necessary. Where two pulleys are used, however, a belt-shifter, N, is used and is manipulated by means of a rod O within convenient reach of the operator.

Without confining myself to the precise details herein shown and described, I claim:

1. The combination of a driving-pulley and driven pulley, a belt connecting them, a swing-frame supporting one of said pulleys, a shaft concentric with the pivot of said swing-frame, and power transmitting connections such as gears between said shaft and the pulley supported by said swing-frame, and means for shifting said frame, substantially as described.

2. The combination of a driving-pulley, a driving pulley, a belt connecting them, a swinging-frame supporting one of said pulleys, a shaft concentric with the pivot of said swing-frame, power transmitting connections such as gears between said shaft and the pulley supported in said frame, a hand-lever held in place by a notched quadrant from the connecting-rod of the hand-lever to said swing-frame, substantially as described.

3. The combination of a shaft and the gear-wheel thereon, a bracket supporting said shaft and having journals formed upon it concentric with said shaft, a swing-frame carried by said journals, a shaft supported in the outer extremity of said swing-frame and having on one end a pinion meshing with said gear and having at the other end a pulley, a belt connecting said pulley to a second pulley, and a device for shifting said swing-frame, substantially as described.

4. The combination of a driving pulley, tight and loose pulleys driven therefrom, a belt connecting them, a swing-frame supporting said driven pulleys, a shaft concentric with the pivot of said swing-frame, and power transmitting connections such as gears between said shaft and the pulley supported by said swing-frame, and means for shifting said frame, substantially as described.

HERBERT HACKNEY.

Witnesses:
IRWIN VEEDER,
TODD MASON.